(No Model.)

G. F. EVANS.
MECHANISM FOR TRANSMITTING POWER.

No. 426,370. Patented Apr. 22, 1890.

WITNESSES:

INVENTOR,

UNITED STATES PATENT OFFICE.

GEORGE FRANK EVANS, OF SOMERVILLE, MASSACHUSETTS.

MECHANISM FOR TRANSMITTING POWER.

SPECIFICATION forming part of Letters Patent No. 426,370, dated April 22, 1890.

Application filed November 6, 1889. Serial No. 329,392. (No model.)

*To all whom it may concern:*

Be it known that I, GEORGE FRANK EVANS, a citizen of the United States, residing at Somerville, in the county of Middlesex and State of Massachusetts, have invented certain new and useful Improvements in Mechanism for Transmitting Power; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the transmission of power, the essential characteristic of which consists in running a loose belt between two pulleys, one of which is encircled by said belt instead of by the usual way of encircling both pulleys with a belt. In said mechanism for transmitting power it has been found impracticable to run wide belts between the pulleys, since the circumference or length of the belt is not the same upon the edges, changes occurring, owing to inequalities in the consistency as likewise in the wear, some parts wearing more than others or stretching more than others. As a consequence, the belt is inclined to run obliquely to the longitudinal axis of the shaft which carries the pulleys in lieu of at right angles thereto, and slip occurs upon the long side of the belt.

The purpose of my invention is to endeavor to obviate such action and to direct a belt or belts at right angles to the longitudinal axis of the shafts, which rotates the pulleys. To effect such purpose, I provide one of the pulleys with flanges, one or both removable, and place about such pulleys an endless band or belt or series of bands or belts, all preferably being of the same length, width, and thickness, each belt being of a length larger than the circumference of the body of the pulley, but less than that of the flanges; hence the latter, one or both, are made removable for purposes of replacing or taking off said belts. By providing a series of belts any slight variance in the lengths of the individual belts, for any cause whatsoever, will not affect the action or speed of any other of the series, and each belt is free to run independently at its own rate of speed or that produced by its own length. Thus no slip occurs, and, further, by guidance of the flanges, each belt will naturally travel toward the shafts at right angles and without oblique shifting.

Figure 1:
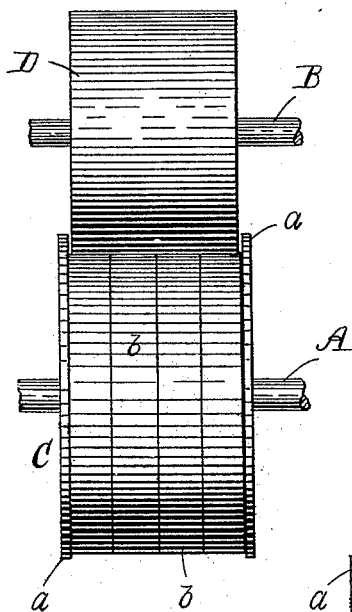
Figure 2:
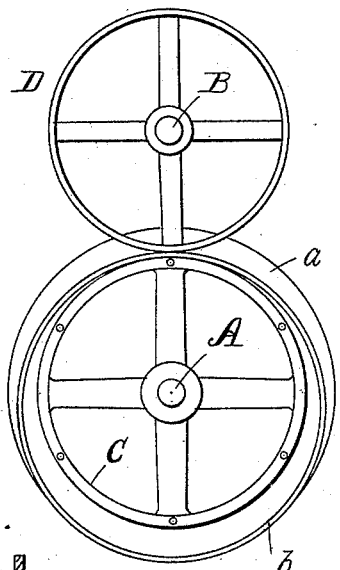
Figure 3:
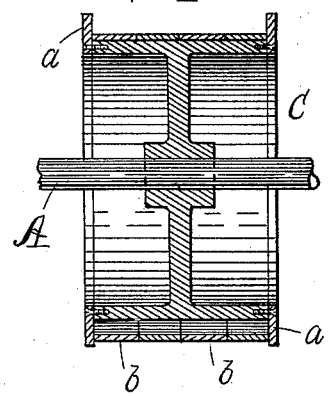
Figure 4:
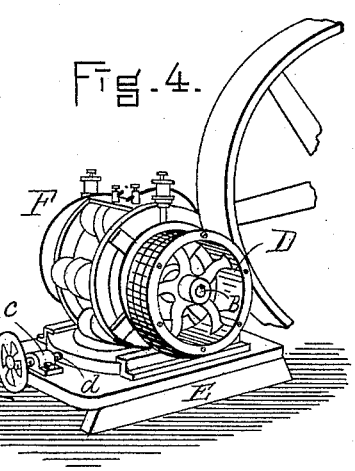

The drawings represent in Fig. 1 a front elevation of mechanism embodying my invention. Fig. 2 is a side elevation, one of the flanges being removed. Fig. 3 is a section of the flanged pulley and belts and removable flanges *a a*. Fig. 4 represents my invention applied to a dynamo, the latter being shown in perspective, while the driving-pulley is represented only in part.

In said drawings, A represents one shaft, preferably the driven. B represents the other shaft, upon which are mounted, respectively, two straight-faced pulleys C D, sections of cylinders cut transversely. The driven pulley C is provided with flanges *a a*, both being shown removable. About said pulley are arranged a series of parallel bands *b b*, preferably of the same length, width, and thickness. Since the length of such belts is less than the circumference of the flanges, one of these is removed to permit belts, as many as may be desired, to be slipped about said pulley, which they loosely encircle. The flange is then replaced, proper pressure is brought to bear upon the belts by the pulleys, and upon rotation of the driver the driven pulley is set in motion.

As it is frequently desirable to start or stop the driven pulley, its shaft, and the mechanism actuated thereby, as likewise to increase or diminish the pressure upon the endless bands, I have shown in Fig. 4 a device by which the driven pulley is caused to approach or recede from the driver, it being understood that said pulleys are non-contiguous, but are adapted to grip the endless bands, which loosely encircle one and pass between said pulleys. This adjusting device is here shown as applicable to electric generators, and consists of a heavy permanently-fixed base E, provided with one or more screws *d*, revolubly secured to standard F, movable in guides upon the base, said standards being fitted with journals in which the shaft B of the driven pulley is mounted. By such an arrangement of a series of endless bands it is evident that the power transmitted may be increased or diminished upon the same pair of pulleys by simply adding to the number of belts or by removing some of them, while, as each belt is traveling independently, no slip occurs, as heretofore, due to the differences in the rate of speed between the two sides of a wide belt resulting from the variation in the length of such sides.

What I desire to claim is—

1. The mechanism for transmission of power between two lines of shafting, composed of two shafts, two pulleys thereupon, one of which is flanged, and a series of endless bands, which loosely encircle the flanged pulley and are adapted to travel independently between and be gripped by said pulleys, the latter non-contiguous, substantially as herein described.

2. The combination, with two lines of shafting, two pulleys thereupon, the driver and the driven one being provided with flanges, one or both removable, of a series of endless parallel bands which loosely encircle the flanged pulley, but smaller in circumference than said flanges and adapted to pass between and be gripped by said pulleys, all substantially as set forth and stated.

3. In mechanism for providing rotary movement between two lines of shafting, the combination, with a shaft and a pulley thereupon, of a second shaft having a flanged pulley, a series of endless bands loosely thereabout, the two pulleys being non-contiguous, and means whereby one is adapted to approach or recede from the other, substantially as and for purposes herein specified.

4. The mechanism for transmitting power between two lines of shafting, consisting of two shafts, two pulleys respectively thereupon, one of which is provided with removable flanges, and an endless band which loosely encircles the flanged pulley, but smaller in circumference than said flanges and adapted to pass between and be gripped by said pulleys, substantially as stated.

In testimony whereof I affix my signature in presence of two witnesses.

GEO. FRANK EVANS.

Witnesses:
 HENRY J. CONANT,
 RICHARD SMITH.